(No Model.) 3 Sheets—Sheet 1.

F. P. BARNEY.
PROCESS OF AND APPARATUS FOR MANUFACTURING CONTINUOUS LENGTHS OF COILED WIRE.

No. 283,557. Patented Aug. 21, 1883.

Witnesses
H. A. Daniels
William P. Poulter

Inventor
Frank P. Barney (No Model.) 3 Sheets—Sheet 2.
F. P. BARNEY.
PROCESS OF AND APPARATUS FOR MANUFACTURING CONTINUOUS LENGTHS OF COILED WIRE.
No. 283,557. Patented Aug. 21, 1883.
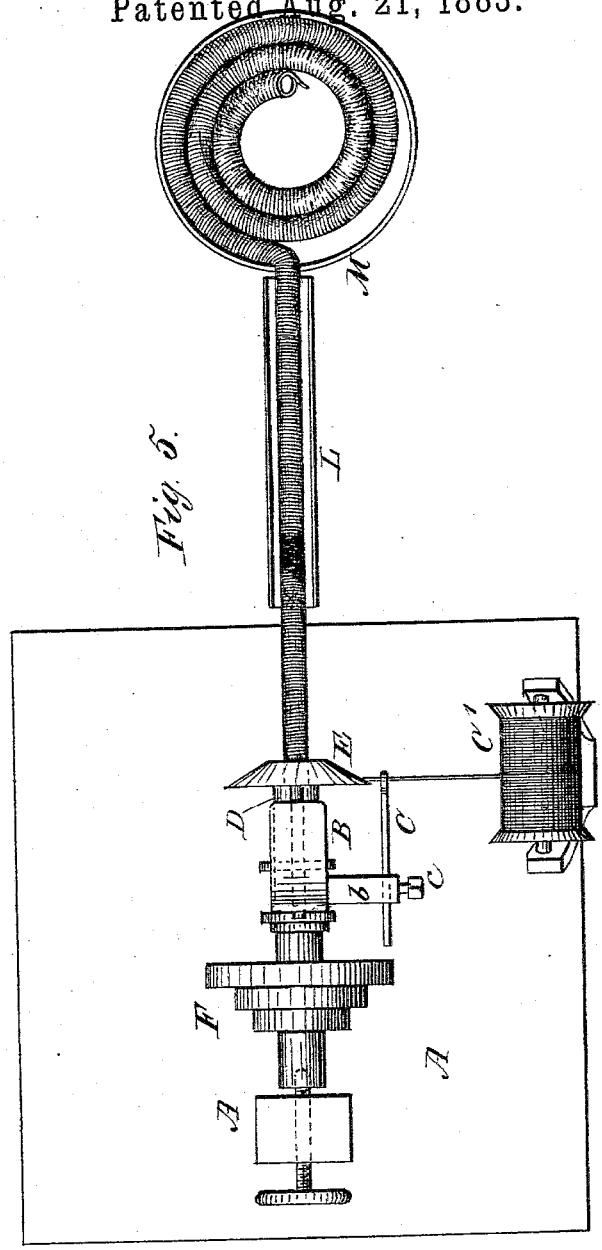
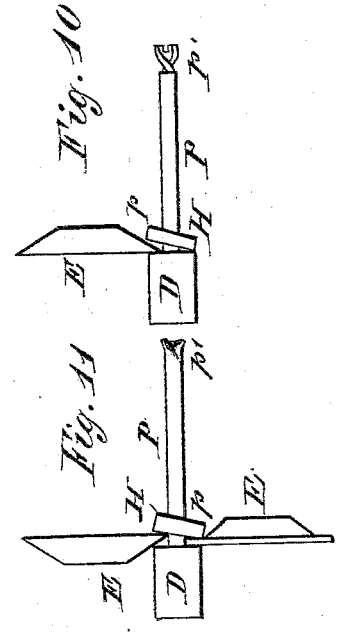
Witnesses.
H. A. Daniels
William E. Poulter
Inventor
Frank P. Barney
by Henry Orth
att'y (No Model.)  
3 Sheets—Sheet 3.
F. P. BARNEY.
PROCESS OF AND APPARATUS FOR MANUFACTURING CONTINUOUS LENGTHS OF COILED WIRE.
No. 283,557. Patented Aug. 21, 1883.
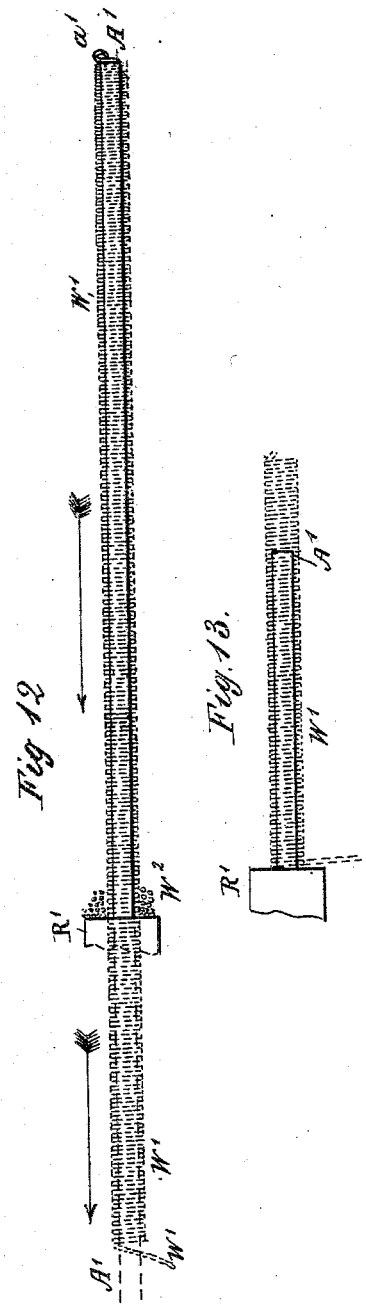
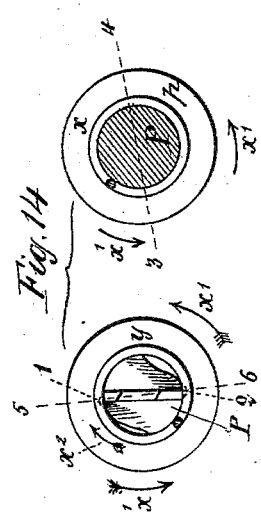
Witnesses  
William S. Boulter  
G. W. Knott
Inventor  
Frank P. Barney  
by Henry Orth  
his atty

UNITED STATES PATENT OFFICE.

FRANK P. BARNEY, OF NORTON, MASSACHUSETTS.

PROCESS OF AND APPARATUS FOR MANUFACTURING CONTINUOUS LENGTHS OF COILED WIRE.

SPECIFICATION forming part of Letters Patent No. 283,557, dated August 21, 1883.

Application filed November 8, 1882. (No model.)

*To all whom it may concern:*

Be it known that I, FRANK P. BARNEY, a citizen of the United States, residing at Norton, in the county of Bristol and State of Massachusetts, have invented certain new and useful Improvements in Processes of and Appliances for Manufacturing Continuous Lengths of Coiled Wire; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a novel method of and means for coiling wire, and to better illustrate its advantages, and to enable others to fully comprehend the same, I will briefly describe the manner in and the means by which wire has heretofore and is now generally coiled.

In the manufacture of such wire coils, in which the coils are laid side by side in close contact, whether for use as coiled springs or for the manufacture of chain-links for watch-chains, or for other purposes where closely-coiled wire is to be used, the coiling is usually effected by securing an arbor of the proper diameter and of a length of about twelve inches into a lathe-chuck, the end of the wire being "made fast to the chuck," and the latter and the arbor rotated. The wire, guided by hand, is coiled thereon until the coil is of the same length as the arbor—that is to say, until the arbor is full. The coiling is therefore effected in a direction "from" the shoulder of the arbor formed by the chuck "toward" the free end of such arbor. The lathe is then stopped, the wire cut at the free end of the arbor, and the latter stripped of its coil, and the process gone over.

Figure 2:
Figure 3:

I am aware that it has been proposed to wind wire into continuous closely-wound coils by employing a spiral-faced tubular die in connection with a mandrel made tapering from its free end toward the point of attachment. Such a construction only partially prevents the twisting of the coil after leaving the mandrel, and is impracticable for coiling oval coils. In the cutting of these coils from the main body of the wire there is a loss or waste of uncoiled wire at the ends of each length of coil of about two or three inches. If the wire used is of precious metal, or plated with precious metal—such as gold—for the manufacture of chain-links, this loss is very considerable. When, however, the wire is to be coiled into closely-coiled oval coils, the difficulties encountered and the waste resulting from the practice now in use is still greater. It has been and is now the general practice in winding oval coils to wind the wire upon what is technically termed a "peg." This peg P, Fig. 2, is about one inch long, and at the shoulder $p$, formed by an enlargement of such peg, or the face of its holder, by which it is secured to the lathe-chuck, it is of the proper oval shape and desired diameter. From the point $p$ to its extremity $p'$ the peg is made tapering, so that the coil will readily move off the peg, and the coiling is effected at the point $p$ of the peg, or immediately at the shoulder referred to. When oval coils are made on this peg, the greatest strain upon the wire is at the point $p$, in order to obtain a perfect link. As the coil moves away from the shoulder along the tapering portion of the peg the strain upon the link ceases, they spring back, and the coil becomes twisted, leaving the peg what is technically termed "corkscrewing," or in the form of a twist-coil, as shown in Fig. 3. In order to utilize such a coil it has to be straightened first, and this is effected as follows: Coils of a length of twenty or twenty-five feet are made up into bunches and annealed, after which they are cut up into pieces about twelve inches along. Each piece is then forced on an arbor or mandrel of the proper shape and diameter, and about fifteen inches long, and the coils are thus brought back to their proper shape. It is obvious that these methods are very laborious and expensive, and when such coils are made of gold wire or gold-plated wire, a serious loss of such precious metal is incurred by the process of annealing, and for this reason plated wire for this purpose requires a much heavier deposit of precious metal.

The object of this invention is not only to avoid the difficulties and losses above set forth, but also to effect a very material saving in the labor connected with the coiling of the wire, and to largely increase the amount of coil produced.

The invention consists in the method of and means for coiling wire in continuous lengths of closely-laid cylindrical or oval coils, substantially as hereinafter fully described.

In carrying out my invention any suitably-constructed apparatus may be employed whereby the wire is caused to be wound upon a guide (which may be a stationary or rotating peg or pin) from its free end to a point of resistance, which may be a shoulder on the guide; or it may be a resistance moving independently of the guide, or a resistance exerted by a collar, disk, or wheel mounted on said guide.

Any suitable pin or peg may be employed, provided it is a straight peg and of practically the same cross-sectional area throughout its length, which may be provided with means for holding the end of the wire to start the operation of coiling and grip or hold the coils, but should at the same time be so constructed as to have a tendency to throw the coils off, and to throw them off with their diameters in a different plane from that in which they are wound or coiled, so that the spring in the coil or tendency to twist or "corkscrew," as it is technically termed, may be avoided.

In the accompanying drawings I have illustrated several constructions and arrangements of devices whereby my invention may be carried into practical effect; and I have also illustrated the devices heretofore used for coiling cylindrical and oval wire, in order that my said invention and its advantages may be better understood.

Figure 1:
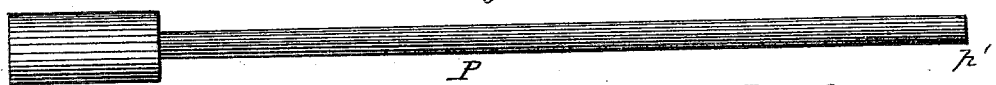
Figure 8:
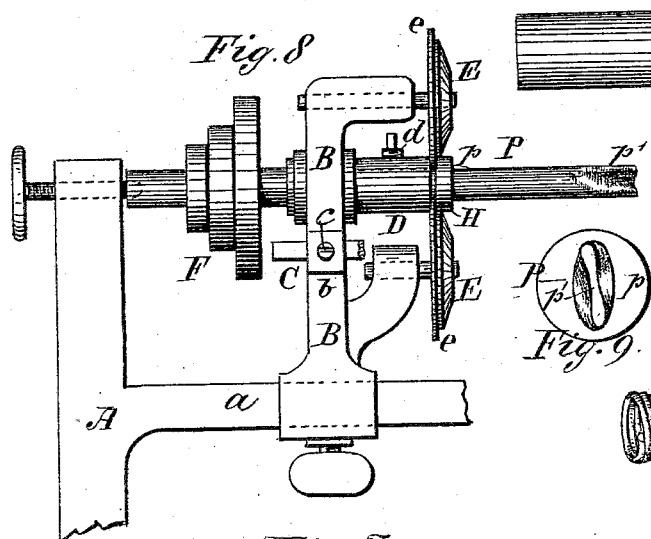
Figure 4:
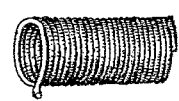
Figure 7:
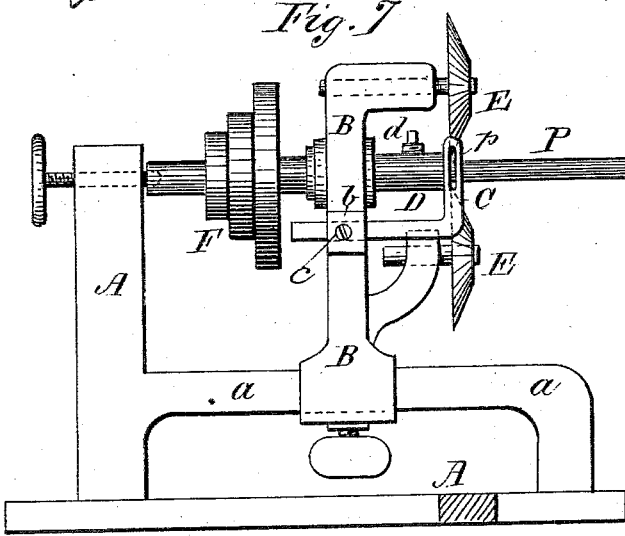
Figure 6:
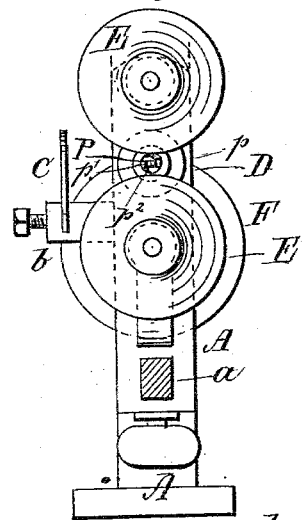

Figure 1 shows an arbor, as heretofore used, for producing lengths of closely-coiled cylindrical coils. Fig. 2 shows a peg or pin, as heretofore used, for producing like lengths of oval coils. Fig. 3 shows in perspective an oval coil as it is produced by the peg or pin shown in Fig. 2, and Fig. 4 shows by a like view an oval coil as it is produced by my improved process and devices. Fig. 5 is a plan view of a machine for coiling wire constructed according to my invention. Fig. 6 is a front elevation, and Fig. 7 is a side elevation thereof, showing one construction of peg. Fig. 8 is a like view, showing a modified construction of the resistance devices and peg. Fig. 9 is a face view of the peg shown in Fig. 8, and Figs. 10 and 11 show modified arrangements of resistance devices. Figs. 12, 13, and 14 are schematic views, designed to illustrate the operations of coiling, as well as the effect of the twist end of the peg on the coils.

Like letters of reference indicate like parts wherever such may occur.

A indicates the frame of the machine, constructed upon the principles of the ordinary bench-lathe, modified to accommodate the additional mechanism employed.

B is the puppet-head, adjustable longitudinally upon its supporting-arm $a$.

C is a slotted guide for guiding the wire to the peg or pin P, said wire being fed from a bobbin, C', rotating upon an arm projecting from the bed A, Fig. 5.

Instead of making the puppet-head adjustable, the guide C may be made adjustable by means of a set-screw, $b$, as shown, whereby the feed of the wire may be adjusted relatively to the length of the peg-holder employed, though this adjustment of puppet-head or guide is not absolutely necessary when holders of uniform length are employed.

D is a tubular holder in which the peg P is secured by means of a set-screw, $d$, said holder being secured to a suitable chuck, rotated in in any usual or preferred manner and by any desired power. In practice I prefer to drive the machine at such a speed as will give the peg about twenty-seven hundred revolutions per minute. This speed may, however, be increased or diminished and excellent results obtained.

One of the most important, if not the most important, part of this invention lies in the peculiar construction of the peg P. As above stated, tapering pegs have heretofore, I believe, been used exclusively for making oval coils. This tapering peg is shown in Fig. 2, the coiling being effected at the shoulder $p$, where the said peg is of the required diameter, tapering thence to a point, or nearly so, to allow the coils to slide off as they are formed. As the tension of the wire upon the coils ceases as soon as each coil moves off the point of their support at the shoulder $p$, the coils spring back, and this is the cause of the twisted shape in which they leave the peg, a portion of such a coil being shown in Fig. 3.

I have found, after a long series of experiments, that wire may be coiled into closely-coiled continuous lengths, of cylindrical or oval form in cross-section, upon a peg of the proper shape, (cylindrical or oval in cross-section,) and of substantially the same diameter throughout its length, and this may be effected in various ways by reversing the method of coiling and effecting it in a direction from the free end of the peg toward its support, and by forming at the free end of the peg a thread or twist running in a direction opposite to the direction of rotation of the peg. The effect of such a peg on the coils and their movement in the direction of winding "on the peg" and in a reverse direction "off the peg" will be fully understood from the description given hereinafter, when what is meant by "the direction of winding" is understood, the meaning of which I will first briefly describe, referring to Figs. 12 and 13.

Assuming, for better illustration, an endless guide or arbor, A, and a like wire, W', the winding of which is to be effected from a given point, $a'$, (to which the initial of the wire is rigidly attached,) in the direction of the arrows, it is evident that the coiling or winding will indefinitely continue in that direction. If, now, we interpose a resistance, R', in the direction of winding, the effect will be to limit or stop the wire from winding in that direction, because the end of the wire is rigidly attached to its arbor, and instead of forming coils that lie one by the side of the other, will form coils that lie one upon the other, as shown at W², Fig. 12. Consequently the direction of winding ceases, except in so far as it may be effected by means other than the rotation of the guide—that is to say, the winding ceases to be effected in one direction as soon as the coils cease to be laid one by the side of the other. If, instead of rigidly attaching the initial of the wire to the guide, as shown in Fig. 13, we leave it free to move in a reverse direction to that in which it is wound, then the "direction of winding" will, practically speaking, not cease. The coils will not be laid "one upon another;" but they will be laid "one by the side of the other," the resistance acting to move the coils as they are formed, and with them the coils already formed, out of the way of the coils being formed, and in a direction opposite to or the reverse of that in which the wire is wound on the arbor. It is of great importance that this should be fully understood, in order to obtain a full comprehension of the processes of coiling, as hereinafter described. It being understood that the direction of winding or path of the wire on the guide is not interrupted by a resistance interposed in such direction or path so long as the coils are laid or wound side by side, the effect of the peg and the resistance interposed in the direction of winding or the path of the wire on the peg will be as follows: The interposed resistance moves the coils as fast as they are formed, and with them the length of coil already formed in a direction the reverse of that in which the coiling is effected—that is to say, away from the resistance. The outer twist end of the peg, by reason of its frictional contact with the coil or coils lying at that point, tends to hold the length of coil on the peg from moving in the direction in which they are forced by the resistance interposed in the direction of winding, thus producing compact or closely-laid coils. If the resistance of the twist end of the peg were as great or greater than that offered by the resistance interposed in the direction of winding, the effect would be the same as if the initial of the wire were even rigidly connected to the peg, as above set forth. The twist, however, of the outer end of the peg is in a direction opposite to that of the rotation of the peg, and consequently tends to throw a coil off said twist end as fast as another coil is formed at the opposite end, or at the resistance interposed in the direction of wind, which resistance is thus enabled to move the coils away as fast as they are formed in an opposite direction. Consequently the direction of winding is not interrupted by said resistance, notwithstanding the fact that the coiling takes place at one point only after the peg is once full. The effect of the twist end may be increased—that is to say, its resistance to that exerted by the resistance R', interposed in the direction of winding, may be increased by forming the terminals of the twist of slightly greater diameter than the diameter of the peg. By this means the terminals of the twist are made to grip the coils—that is to say, the terminals of the twist will engage the coils by wedging or biting between two such coils, and thus act more effectually as a screw-feed, the coil forming the female thread and the twist end of the peg the male thread, provided a power is exerted upon the coil the tendency of which is to hold the coil rigidly, so to say, relatively to the peg in a manner similar to the power exerted upon a stationary nut on a rotating bolt. This power, as already stated, is furnished by the interposed resistance—i. e., the shoulder on the peg for instance, or that formed by its holder, or by a disk or collar loosely placed against said shoulder, or a disk or several disks rotated independently of the peg and made to act as interposed resistances, which in forcing the length of coil toward the twist end holds said coil rigidly, so to say, to allow the twist to act as a screw in the thread formed by the closely-laid coils, and throw the same off, notwithstanding the fact that said peg rotates with the coil. This throwing off, or, more properly, screwing off, of the coils is due to the fact that the twist at the end of the peg runs in a direction the reverse of that of the rotation of said peg and to the power exerted upon the length of coil in crowding it in a direction opposite to that in which the wire is wound, and enables the twist end to act upon the coils.

In either of the above-described cases the wire is wound upon the peg between two resistances acting in opposite directions.

The resistance R' must be such as to overcome that which is exerted by the twist end of the peg, otherwise the coils would not move off the latter, and the direction of coiling would be interrupted and the coils laid one upon another. These conditions I obtain as follows: The peg P is cylindrical or oval in cross-section, according to the form of the coil to be wound, and is of equal diameter throughout its entire cylindrical or oval portion. The outer end, $p'$, of the peg is twisted somewhat in the form of the twist-drill, the path of thread of the twist running in a direction opposite to the direction of rotation of the peg—that is to say, if the peg is to be rotated from right to left, the thread or path of the twist should run from left to right. This twist at the end of the peg, being formed in a direction opposite to that of the rotation of the latter, tends to throw the coils off at that end as fast as they are formed at the opposite end, and its frictional contact with the interior periphery of the coil acts as a resistance exerted in the direction of winding, and causes the coils to be wound close together, or, as it is technically called, "hug each other." This resistance, as above stated, can be increased by making the outer end of the twisted portion of the peg of greater diameter than the peg itself—that is to say, by spreading the terminals of the twist laterally, care being had not to spread them too much, as the twist end would then grip the coils so tight as to prevent their coming off the peg, in which case it would be equivalent to rigidly attaching the wire to the end of the peg, and the resistance interposed in the direction of winding would then become an absolute stop and cause the coils to be laid one upon the other, since the interposed resistance would not be sufficient to move the coils already formed out of the path— that is to say, out of the direction of winding of the wire—but as the twist is in a direction opposite to that of the rotation of the peg, as a coil is formed at the interposed resistance the length of coils on the peg are forced outward or away from the resistance a distance equal to that occupied by the coil being formed, and a coil at the end of the peg is moved or forced off. In other words, as one coil is formed at one end of the peg another is forced off at the opposite or twist end of such peg. It follows, therefore, that the interposed resistance does not interrupt the direction of winding, and that the wire in forming the coils travels constantly in one direction, while the formed coils travel in a reverse direction.

In practice I have found that if the outer extremity of the threads of the twist are spread so that the diameter of the terminals of the twist is about one one-hundredth of an inch greater than the diameter of the peg, the best results are obtained. If, however, the twist at the end of the peg is of less diameter than the peg itself, the coil will come off twisted or corkscrewing.

By means of the described construction of peg the coils not only spin off at the twist end as fast as they are formed at the resistance interposed in the direction of winding, but on leaving the peg the diameter of the coil will lie in a different plane from that which it occupies while on the peg. This is another very important function of the peg, inasmuch as this movement of the coils in the change of the plane of their diameters takes the twist out of such coils and prevents them from coming off cork-screwing. This movement will be better understood by reference to Fig. 14, in which P is the peg and 1 and 2 the terminals of the twist end, which is of greater diameter than the peg, the whole being shown on an exaggerated scale to better illustrate the operation.

The rotation of the peg is in the direction of the arrows $x'$, and the coils are shown in their respective positions. We will assume that $x$ is the coil being formed at the resistance R', and $y$ the one being thrown off the twist end. If the machine were suddenly stopped at the moment when a coil, $x$, is being formed, and a coil, $y$, thrown off, the diameter of all the coils on the peg lying in the same plane 3 4, the diameter of the initial coil would lie in the plane 5 6—that is to say, the coil $y$ will have been moved in a direction the reverse of that of the rotation of the peg and the coils thereon, as shown by arrow $x^2$—because the twist of the peg is in that direction. In this manner the twist is taken out of the coils, and they leave the peg without cork-screwing. This counter resistance or pressure, acting in opposition to that exerted by the twist end of the peg, is produced by the crowding of the wire against the shoulder D, when the coiling is effected after the peg is once wound full. Instead of the fixed resistance, a movable resistance may be employed, said resistance being set in motion by frictional contact with the coil and shoulder, or the face of the holder; or a positive movement may be imparted thereto either in the direction of rotation of the peg or in a reverse direction.

As shown in Fig. 5, a beveled disk, E, is mounted in suitable bearings above the peg P, and is driven by a band from the step or other suitable driving-wheel, F, and in the same direction as the peg P.

It is obvious that by crossing the belt that drives the disk the latter may be rotated in a reverse direction to that of the peg and operate equally as well. It is further obvious that said disk need not necessarily be located above the peg, as it may be located at any other suitable point. Instead of one disk, two or more such disks may be employed, and instead of moving them positively, they may be rotated by frictional contact with the coil and shoulder, as shown in Figs. 6 and 7.

As shown in Fig. 8, the resistance interposed in the direction of winding is composed of a loose collar, H, interposed between the coil and the disks, and said disks, instead of having their entire acting-surface beveled, are formed with an annular projecting rim or flange, $e$, that acts upon the collar H. As shown by Fig. 10, one beveled disk is employed in conjunction with the collar H, so that the latter is held at an angle to the axis of the peg, whereby a still greater resistance is offered to the movement of the coils toward the point $p$, where the coiling is effected. This greater resistance is due to the fact that the collar is held in an inclined position, bearing on the coil already formed, as well as on the wire at the point where a new coil is being formed. This latter arrangement I prefer in coiling oval wire, though I do not wish to limit myself thereto, as the construction just described will answer the purposes equally as well.

In Fig. 11, I have shown two forms of disks combined — namely, a beveled disk and a flanged disk—acting upon the coil, and said beveled disk being reversed on its shaft, its flat or plane face acting upon the coil. By the combination of the two disks I obtain the same form of resistance as that described in relation to Fig. 10, namely, a resistance exerted upon a line at an angle to the axis of the coil or peg. The peg P, as shown in Figs. 6 and 7, has a rectangular notch, $p^2$, formed in its twist end for the insertion of the wire end in commencing the operation of coiling.

In Figs. 8 and 9, I have shown a peg having a different twist from that shown in the other figures, said peg being of an oval shape in cross-section for coiling oval coils, and is devoid of the notch $p^2$, as this notch is not absolutely necessary to start the operation of coiling, though I prefer to provide the twist end of the peg with such notch, as it greatly facilitates the starting.

I have above described a guide for guiding the wire to the peg arranged upon one side of the latter. This need not necessarily be the case, as the wire can be fed to the peg from any other convenient point, as from above or from below, in which case the position of the bevel-wheels will have to be altered to suit the change of direction of the feed, unless a collar, H, of sufficient length be employed to project slightly beyond the face of said disks.

The operation of the machine may be briefly described as follows: The wire being placed in the notch $p^2$ of the peg P, Figs. 5, 6, and 7, or bent over the face of the peg, (shown in Fig. 8,) and the peg rotated, the wire will coil onto the latter until it is full. It will then, owing to the resistance of the twist end of the peg, commence to crowd against the shoulder $p$, or disk or disks E, or the collar H, the resistance of which, being greater than that exerted by the twist end of the peg, will force the first coil formed over said end, which latter will then wedge in between the first and second coils, and the operation of "throwing" or "screwing off" continues at that end as long as coils are wound at the opposite end against said greater resistance.

By means of these processes and appliances I am enabled to spin off coils of any desired length, though I prefer to make them from forty-five to fifty feet long, and as the entire coil is rotating, to prevent its tangling, I conduct it down a guide, L, into a cylindrical receiver or pan, M, constructed of or lined with a material capable of acquiring or having a hard smooth surface. In practice I preferably employ tin or zinc, or other sheet metal having a smooth surface. The coil when conducted to this receiver, as soon as it comes in contact with its walls, will of itself coil around and around until the bottom of the vessel is full, when it should be cut.

When the peg is rotated at or about at the speed hereinbefore described, an ordinary laborer in one day can convert into coils from one hundred and fifty to two hundred pounds of such wire as is usually employed for making chain-links or coiled wire springs.

Instead of a rotating peg, a stationary peg may be employed, and the wire caused to travel around the peg.

Having now described my invention, what I claim is—

1. The herein-described process of coiling wire into continuous lengths, which consists in interposing a resistance in the direction of winding, forming the coils at the point of resistance with a given diameter of such coils in a given plane relatively to the plane of winding, and causing said coils to move in a direction coincident with that in which the resistance exerts its power with the said given diameter in a different plane relatively to the plane of winding, as described.

2. The herein-described process of coiling wire into continuous lengths, which consists in interposing in the plane of winding two resistances of different degree, forming the coils at the point of greatest resistance with a given diameter of such coils in a given plane relatively to the plane of winding, and causing the coils to move away from the point of least resistance with their said given diameter in a different plane relatively to the plane of winding, as described.

3. The herein-described process of preventing a continuous length of coiled wire from becoming entangled by reason of the continuous rotation thereof upon its own axis, which consists in causing one end of such coiled wire to impinge upon a cylindrical resisting-surface, and feeding the wire continuously against such resisting-surface, whereby it is made to coil upon itself, as described.

4. The herein-described process of making continuous lengths of coiled wire and preventing the same from becoming twisted and tangled, which consists in interposing a resistance in the direction of winding, forming the coils at the point of resistance with a given diameter of such coils in a given plane relatively to the plane of winding, and causing said coils to move in a direction coincident with that in which the resistance exerts its power, with the said given diameter in a different plane relatively to said plane of winding against an annular resisting-surface, as described.

5. A peg for coiling wire, having at one end a twist of greater diameter than the greatest diameter of the peg, substantially as and for the purpose set forth.

6. A peg for coiling wire, having at one end a twist of greater diameter than the greatest diameter of the peg, said twisted end being provided with a notch, $p^2$, substantially as and for the purpose specified.

7. A peg for coiling wire, having twist-threads formed at one of its ends of greater diameter at the terminals of the threads than that of the peg, substantially as and for the purpose specified.

8. A peg of oval form in cross-section and of equal long and short diameters throughout its length, said peg having a twist end, the longer face of which is of slightly greater diameter than the long diameter of the body of the peg, substantially as and for the purpose specified.

9. In a machine for coiling wire, the combination of a rotating coiling-peg, two resisting-surfaces exerting different degrees of power in opposite direction, between which the coiling is effected to cause the coils to move from greater over the least resisting-surface, and means for giving to said coils a partial rotation as they move off the lesser resisting-surface in a direction opposite to the direction of rotation of the peg, as and for the purposes described.

10. In a machine for coiling wire, the combination of a rotating peg, two rotating resisting-surfaces between which the coiling is effected, and exerting a power of different degree in opposite direction to force the coils over the lesser resisting-surface, and means to impart a partial rotation to the coils as they move off the lesser resisting-surface in a direction opposite to the direction of rotation of the peg, as and for the purposes specified.

11. In a machine for coiling wire, the combination, with the coiling-peg having a twist of greater diameter than the greatest diameter of the body of the peg formed at its free end, of a resisting-surface at the opposite end of the peg, against which the coiling is effected, and suitable mechanism for rotating the peg, substantially as and for the purposes specified.

12. In a machine for coiling wire, the combination, with the coiling-peg having a twist of greater diameter than the greatest diameter of the body of the peg formed at its free end, of a movable resisting surface or surfaces at the opposite end of the peg, against which the coiling is effected, and suitable mechanism for rotating said peg and resisting surface or surfaces, substantially as and for the purposes specified.

13. The combination, with the coiling-peg P and the abutment or shoulder $p$, of a beveled disk and a flanged disk arranged for operation relatively to the peg and its shoulder, substantially as and for the purposes specified.

14. In a machine of the class described, the combination of a coiling-peg, a cylindrical receiver to receive the coil as it is forced off the peg, and an intermediate guide to guide the coil into such receiver, as described, for the purposes specified.

In testimony whereof I affix my signature in presence of two witnesses.

FRANK P. BARNEY.

Witnesses:
  BENJ. L. WOOD,
  ELISHA T. JACKSON.